K. KÜNZI.
AUTOMATIC COUPLING WITH FUNNEL SHAPED HEAD FOR VEHICLES.
APPLICATION FILED DEC. 4, 1914.

1,145,494.

Patented July 6, 1915.
3 SHEETS—SHEET 1.

Witnesses:
B. Dommers
E. Leckert

Inventor
Karl Künzi.
By [signature]
Atty

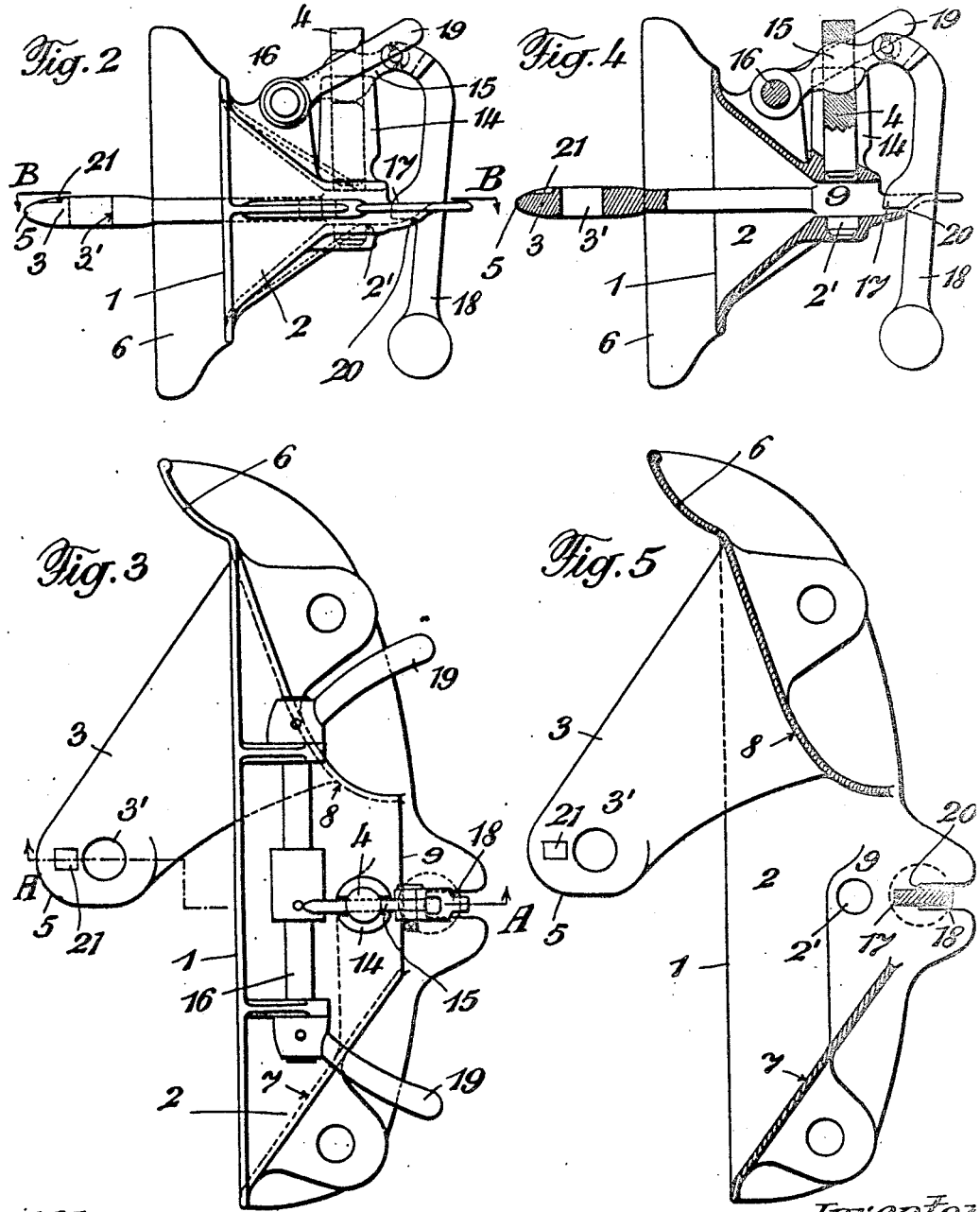

K. KÜNZI.
AUTOMATIC COUPLING WITH FUNNEL SHAPED HEAD FOR VEHICLES.
APPLICATION FILED DEC. 4, 1914.
1,145,494.
Patented July 6, 1915.
3 SHEETS—SHEET 3.
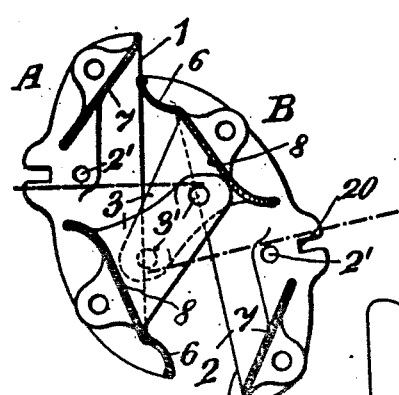
Fig. 9
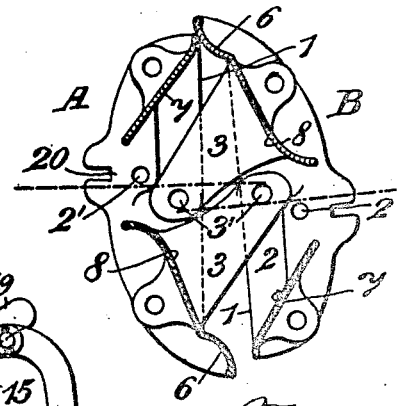
Fig. 10
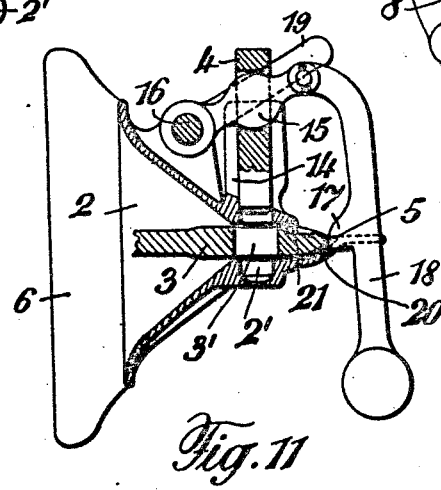
Fig. 11
Fig. 12
Fig. 13
Witnesses:
P. Dommers
E. Leckert
Inventor
Karl Künzi

UNITED STATES PATENT OFFICE.

KARL KÜNZI, OF SCHAFFHAUSEN, SWITZERLAND, ASSIGNOR TO THE FIRM OF AKTIENGESELLSCHAFT DER EISEN- UND STAHLWERKE VORM. GEORG FISCHER, OF SCHAFFHAUSEN, SWITZERLAND.

AUTOMATIC COUPLING WITH FUNNEL-SHAPED HEAD FOR VEHICLES.

1,145,494.  Specification of Letters Patent.  Patented July 6, 1915.

Application filed December 4, 1914. Serial No. 875,481.

*To all whom it may concern:*

Be it known that I, KARL KÜNZI, a subject of the Emperor of Germany, residing at Schaffhausen, Switzerland, have invented new and useful Improvements in Automatic Couplings with Funnel-Shaped Heads for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is an automatic coupling with funnel shaped head for vehicles, in which the coupling eye arranged in the funnel shaped head of the coupling is beveled at its exterior border to a knife edge.

The couplings with funnel shaped heads till now in use have the great drawback, that the height of construction is too great in proportion to the available width of the funnel shaped head. The consequence thereof is a limited possibility of employment of such couplings. With the coupling according to the present invention this drawback may be avoided. For this purpose on the outside of the coupling eye are provided pressing and guiding surfaces lying diametrically opposite one to each other and beginning at the impact faces of the halves of the coupling, which are directed forwardly and outwardly at an inclined angle, so that by an oblique encountering of the two halves of the coupling the pressing and guiding surface of the one half of the coupling touches the impact face of the other half of the coupling and slides along this face till the pressing and guiding surfaces of both halves of the coupling can embrace the opposite funnel shaped heads of the coupling and complete the centering of the said heads.

In the accompanying drawings one form of execution of the object of the invention is shown by way of example.

Figure 1:
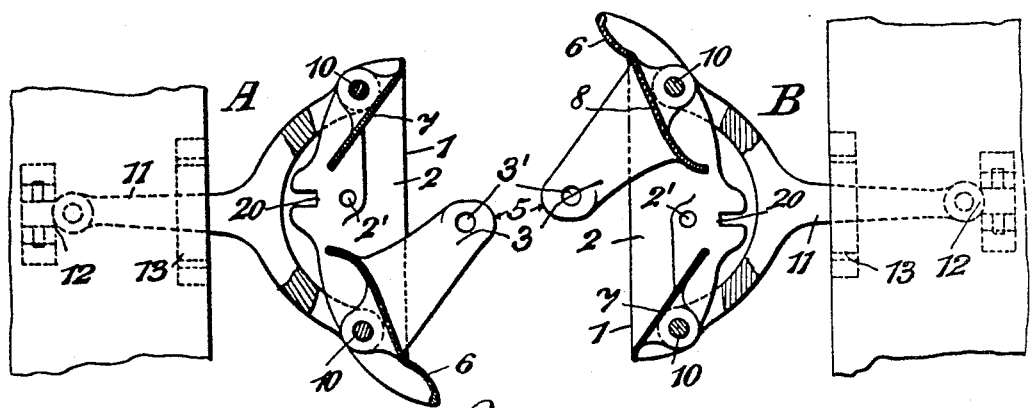
Figure 6:
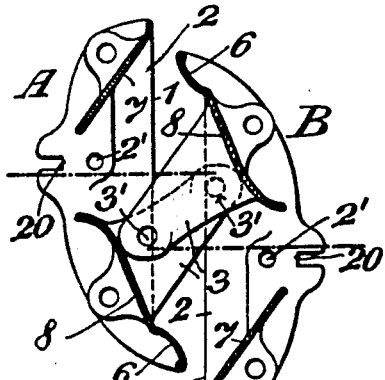
Figure 7:
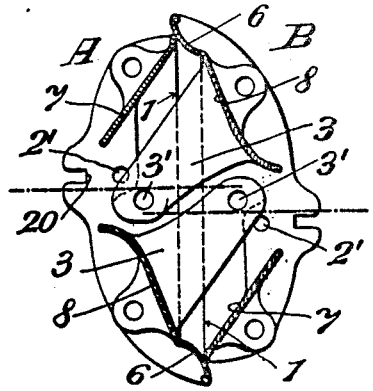
Figure 8:
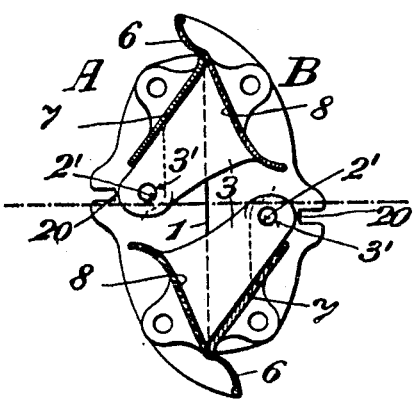

Figure 1 shows the two halves of the coupling in a horizontal section and in an open position, Fig. 2 a side view of the one half of the coupling, Fig. 3 a plan view of Fig. 2 and Fig. 4 a vertical section on the line A—A of Fig. 3 and Fig. 5 a horizontal section on the line B—B of Fig. 2; Fig. 6 shows two halves of the coupling gripping one into the other, which lie parallel and the centers of which are displaced to each other, Figs. 7 and 8 show the same halves of the coupling in the positions which they take to each other by the further opposite sliding one into the other till the complete locking of the coupling, Figs. 9 and 10 show in two succeeding phases the locking of two halves of the coupling, which touch each other under an angle and the centers of which are at the same time displaced one to the other; Figs. 11–13 show in succeeding phases the position of the locking bolt of the one half of the coupling to the coupling eye of the other half of the coupling by the automatic locking and by the disengaging by hand.

The Figs. 6–10 are represented diagrammatically in a horizontal axial section on the line B—B of Fig. 2 and the Figs. 11–13 in a vertical axial section on the line A—A of Fig. 3 through the coupling.

Each half of the coupling (Figs. 1–5) possesses a horn-like coupling eye 3, which has a fixed position in the funnel 2 of the half of the coupling and surpasses the impact face 1 thereof, the free end of which is directed outward and toward the middle axis of the funnel 2. In the funnel 2 of each half of the coupling there is provided a vertical bore 2' (Fig. 5), which corresponds with the bore 3' in the coupling eye 3 of the counter half of the coupling (Fig. 8). The bore 2' serves as a guide for the locking bolt 4, which connects the halves of the coupling one to the other. The coupling eye is at its exterior border formed in such a manner, that the coupling eye of one half of the coupling can pass the coupling eye of the other half of the coupling or that the coupling eyes can, if necessary slide away one over the other in the centering action (Figs. 6 and 9). Laterally-outward of the coupling eye is arranged the pressing and guiding surface 6 formed by a rib which begins at the impact face and is directed forward-outward (Figs. 1–5). The pressing and guiding surfaces 6 of the two halves of the coupling lie opposite diametrally to each other (Fig. 1).

Each funnel 2 of the coupling has two faces 7 and 8 inclined to the middle axis of the funnel, the faces 7 of which are straight and the faces 8 are curved; the faces 8 serving hereby as guiding faces for the coupling eyes 3, to center it when locking the coupling. As can be seen in the drawing, especially in Fig. 5, the two faces 7 and 8 possess at the level of the bore 2' a gap, forming an opening 9 for the entrance of the coupling eye 3 of the counter half of the coupling. To replace this interrupted part of the guiding faces of each coupling funnel 2 the aforementioned pressing and guiding surfaces 6 are provided which surpass the impact faces 1 of each half of the coupling.

Each half of the coupling is fastened to forked ends of a draw-bar 11 by means of bolts 10, which go through eyes of the funnel 2; said draw-bar being geared on the underside of the appertaining vehicle by means of a double jaw 12 in such a manner, that the half of the coupling together with the draw-bar can move to and fro as well in a horizontal as in a vertical direction. The draw-bar 11 is guided with a corresponding play in a guiding yoke 13 fixed to the underside of the vehicle (Fig. 1.).

The locking bolt 4 of each half of the coupling is loosely mounted in a vertical guide 14, which is provided at the upperside of the funnel 2 and is carried by an arm 15, fixed on a disengaging shaft 16, which is also mounted on the upperside of the funnel, whereby this arm passes across a slot in the locking bolt 4. At the free end of this arm is joined a pawl 18 serving as a weight and presenting a nose 17. On the two ends of the shaft 16 there are still fixed two levers 19, which serve as a handle to disengage the locking bolt by hand. At the back end of the funnel shaped head 2 of each half of the coupling there is still provided a notch 20 and to the free end of each coupling eye 3 is also provided a notch 21 for the nose 17 of the pawl 18 (Figs. 1, 5, 11 and 13).

The function of this coupling is the following: Supposing that the two halves of the coupling A and B take-in a parallel position, but are displaced with their middle axis toward each other (Fig. 6) and can freely move in a horizontal direction toward the one or the other side. By moving the two vehicles toward each other the coupling eyes 3 of both halves of the coupling may slide one over the other and enter oppositely in the funnel 2. The coupling eye 3 of the one half of the coupling is now so far centered by the funnel 2 of the other half of the coupling, till it has reached the opening 9 in the last mentioned funnel (Fig. 7), by which the centering through the faces 7 and 8 is finished. During this partial centering the funnel 2 of the one half of the coupling is brought into the reach of the pressing and guiding surface 6 of the other half of the coupling, which now centers completely the funnel 2 of the first mentioned half of the coupling and brings it in the closed position (Fig. 8). The locking bolts 4, which are in their upper position before the locking of the coupling and which sit-on with their noses 17 on the notches 20 of the funnels 2 of both halves A and B of the coupling, are held in this position (Fig. 11), and as soon as the pawls 18 are displaced out of the notches 20 by the coupling eyes 3 entering in the openings 9 of the funnels 2 and the bores 2' and 3' lie one upon the other, the locking bolts under their proper weight and the weight of the pawls 18 and arms 15 fall into the bores 2' and 3' (Fig. 12) and effect the complete locking of the two halves A and B of the coupling.

When the halves A and B of the coupling of two vehicles, standing in a curve, touching each other under an angle and when the middle axis of these halves are displaced to each other in such a manner, that the coupling eyes 3 overlap each other (Fig. 9), the pressing and guiding surface 6 of the half B of the coupling acts in its quality as pressing surface and lies against the impact face 1 of the half A of the coupling and effects a pressure upon the part of the half A of the coupling, which is directed inward the curve. This pressure prevents an outward swinging of the half A of the coupling. The pressing and guiding surface 6 surpassing the impact face 1 of the half B of the coupling holds at once the two halves of the coupling at a distance from each other, so that they can be put in line oppositely and the angle formed by the two impact faces 1 can be reduced. This separating of the two halves of the coupling by the pressing and guiding surface 6 of the one half of the coupling permits also to hold small the inclination of the inner face 8 of the funnel 2 on the side of the coupling eye 3 and to limit it to the measure of the proper angle of friction till a certain deepness of the funnel 2. As is seen in Fig. 9 only the one coupling eyes has contact with the funnel of the counterhalf of the coupling, that is to say the coupling eye 3 of the half A slides along the face of the half B of the coupling. During further sliding of the coupling halves into each other, a change of support takes place, i. e., the coupling eye 3 of the coupling half B comes into contact with the funnel 2 of the coupling half A, while the coupling half A comes away from the funnel of the coupling half B. (Fig. 7 shows the coupling halves some time after the change of support.) From the point where the change of support takes place and up to which point the inclination of the inner surface of the coupling funnel at the side of the coupling projection is limited to the value of the friction angle proper, the inclination in the funnel of the coupling half constantly increases and accordingly the guide surface 8 in the funnel of the coupling halves, beginning from the point in question, follows a convex curve (Fig. 5).

The guiding face 8 in the funnel 2 of each half of the coupling on the side of the coupling eye and the pressing and guiding surface 6 stand in such a reciprocal relation to each other, that the pressing and guiding surface 6 acts in its quality as guiding surface, before two halves of the coupling take-in a complete parallel position one to each other (Fig. 10). In the further course of the gripping one into each other of both halves of the coupling the pressing and guiding surfaces 6 of the two halves of the coupling embrace the opposite funnels and thereby complete the centering shown in Fig. 8.

For the disengaging of the coupling the pawl 18 of each half of the coupling is raised in turning the shaft 16 by means of the levers 19 and is set with the nose 17 upon the notch 21 of the coupling eye 3 of the counterhalf of the coupling, thereby the locking bolt 4 is drawn out of the bore 3' of the coupling eye 3 (Fig. 13). The vehicles can now be separated from each other, while at the same time the pawls 18 fall down and come to lie upon the notches 20 on the funnel 2, the locking bolts 4 taking therefore again a position prepared for the relocking of the halves of the two couplings (Fig. 11).

With the described automatic coupling with funnel shaped head a greater width for the funnel in proportion to the height of construction is obtained, from which results a greater possibility of employment of this coupling. This relation is obtained by the arrangement of the pressing and guiding surface 6, which, as mentioned permits the reduction of the inclination in the funnel on the side of the coupling eye without that thereby an injury of the working of the coupling would ensue; a widening of the funnel is accordingly obtained by equal remaining proportions. The inclination of the guiding face 8 in the funnel 2 on the side of the coupling eye is determined by the arrangement of the pressing and guiding surface 6 and by the inclination and form of the same.

What I wish to claim is:

1. In an automatic coupling for vehicles, two movably mounted coupling halves each having a funnel shaped head and an impact surface, a coupling eye on each of said coupling halves arranged in the funnel of the latter, projecting beyond the impact surface and provided with a surface formed into a knife-edge, said coupling eyes being adapted to slide over each other during coupling and enter into the funnel of the opposed coupling half, means extending outside the coupling eyes and disposed adjacent to the impact surfaces of the halves of the coupling adapted to strike against the impact surface of the opposed coupling half and slide along the latter outwardly upon an oblique meeting of the coupling halves to center the latter, and means adapted to wholly lock said halves in their centered position.

2. In an automatic coupling for vehicles, two movably mounted coupling halves each having a funnel shaped head and an impact surface, a coupling eye on each of said coupling halves arranged in the funnel of the latter, projecting beyond the impact surface and provided with a surface formed into a knife-edge, said coupling eyes being adapted to slide over each other during coupling and enter into the funnel of the opposed coupling half, diametrically opposite projections extending outside the coupling eyes and beginning at the impact surface of the halves of the coupling and directed at an angle forwardly and outwardly, said projections being adapted to strike against the impact surface of the opposed coupling half and slide along the latter outwardly upon an oblique meeting of the coupling halves until the projections of the two halves of the coupling can surround the coupling half situated opposite and complete the centering, and means on each coupling half adapted to be operated by the coupling eye of the opposed half upon a centering of the coupling to effect the complete locking of the latter.

3. The combination, in an automatic coupling for vehicles of two movably mounted coupling halves each having a funnel shaped head and an impact surface, a coupling eye on each of said coupling halves arranged in the funnel of the latter, projecting beyond the impact surface and provided with a surface formed into a knife-edge, said coupling eyes being adapted to slide over each other during coupling and enter into the funnel of the opposed coupling half, diametrically opposite projections extending outside the coupling eyes and beginning at the impact surface of the halves of the coupling and directed at an angle forwardly and outwardly, said projections being adapted to strike against the impact surface of the opposed coupling half and slide along the latter outwardly upon an oblique meeting of the coupling halves until the projections of the two halves of the coupling can surround the coupling half situated opposite and complete the centering, a horizontal shaft on each coupling half, a slotted locking bolt on each coupling half adapted to fall in bores of the coupling eyes and funnels to effect a complete locking of the coupling, an arm fixed on each of said horizontal shafts and passing through a slot of one of said bolts, a pawl jointed to each of said arms and acted upon by the coupling eye of the opposed coupling half upon a centering of the coupling, and levers on each of said shafts adapted to rotate the latter and lift the bolt acted upon by this shaft out of its locking position.

In testimony that I claim the foregoing as my invention, I have signed my name in presence of two subscribing witnesses.

KARL KÜNZI.

Witnesses:
ERNST FISCHER,
CARL GUBLER.